United States Patent [19]

Collins, Jr.

[11] Patent Number: 4,929,819

[45] Date of Patent: May 29, 1990

[54] METHOD AND APPARATUS FOR CUSTOMER PERFORMED ARTICLE SCANNING IN SELF-SERVICE SHOPPING

[75] Inventor: Donald A. Collins, Jr., Cambridge, Ohio

[73] Assignee: NCR Corporation, Dayton, Ohio

[21] Appl. No.: 283,116

[22] Filed: Dec. 12, 1988

[51] Int. Cl.[5] ...................... G06F 15/84; G06K 19/06

[52] U.S. Cl. ...................................... 235/383; 235/385

[58] Field of Search ................................ 235/383, 385

[56] References Cited

U.S. PATENT DOCUMENTS

| | | | |
|---|---|---|---|
| 3,836,755 | 9/1974 | Ehrat | 235/61.7 R |
| 3,949,194 | 4/1976 | Catto et al. | 235/61.11 E |
| 4,071,740 | 1/1978 | Gogulski | 235/431 |
| 4,237,483 | 12/1980 | Clever | 358/108 |
| 4,369,361 | 1/1983 | Swartz et al. | 235/470 |
| 4,373,133 | 2/1983 | Clyne et al. | 235/383 |
| 4,676,343 | 6/1987 | Humble et al. | 186/61 |
| 4,838,383 | 6/1989 | Saito | 235/383 |

*Primary Examiner*—Harold I. Pitts

*Attorney, Agent, or Firm*—Wilbert Hawk, Jr.; Albert L. Sessler, Jr.

[57] ABSTRACT

An electronic module detachably mounted on a shopping cart includes a scanner for scanning bar coded information on items selected for purchase, a data processing device for data storage and control purposes and video recording apparatus capable of recording a view of the selected item as it is scanned and again as it is placed in a receptacle in the shopping cart to enable a customer to generate a record of items selected, which record can be used to facilitate checkout operations, and to provide security against improper scanning, or failure to scan, items selected for purchase.

27 Claims, 12 Drawing Sheets

FIG. 5A
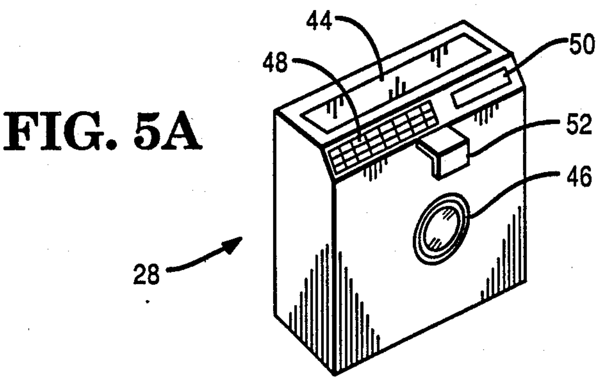
FIG. 5B
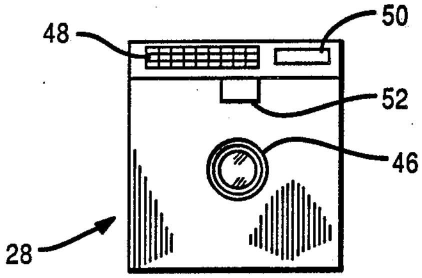
FIG. 5C
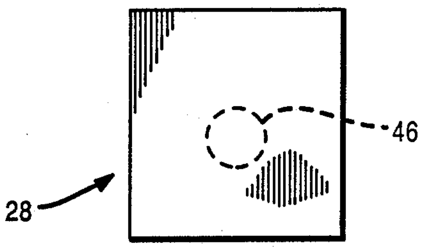
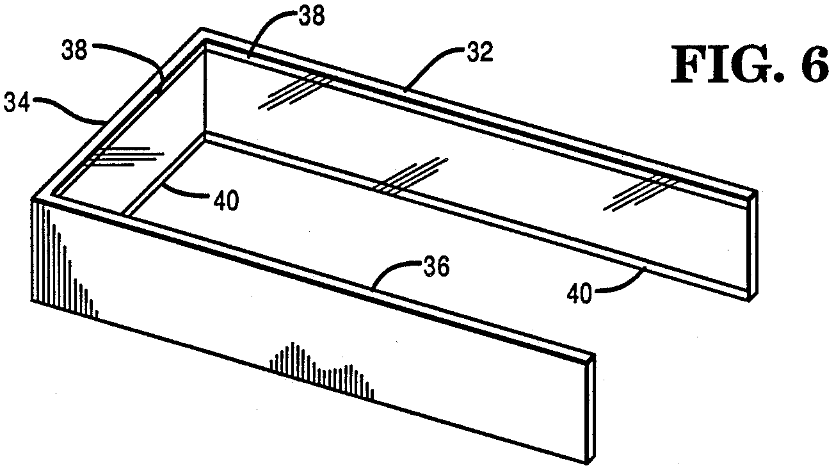
FIG. 6

METHOD AND APPARATUS FOR CUSTOMER PERFORMED ARTICLE SCANNING IN SELF-SERVICE SHOPPING

BACKGROUND OF THE INVENTION

In recent years, more and more retail establishments have employed self-service operations, in which customers utilize shopping carts and move through the establishment to collect the items which they wish to purchase. The selected articles are then transported to checkout counters where employees of the establishment ascertain the price of each selected item, often by use of a scanner at the checkout counter which reads a bar code printed on the item, and total the amount due, after which the employee receives payment from the customer in the form of cash, check or a credit or debit card to complete the transaction. While the use of self-service operations and the automation of price reading and machine entry by the use of scanners have greatly increased efficiency and reduced costs in retail establishments, a substantial number of clerks at the checkout counters are still required, and lines of customers waiting at the checkout counters to complete their transactions are still commonplace. A system which would reduce the number of clerks necessary, and which would facilitate the movement of customers through the checkout operations would therefore further enhance the efficiency of retail establishments using self-service operations.

SUMMARY OF THE INVENTION

The present invention relates to a method and apparatus for self-service retail operations, and more particularly relates to a method and apparatus for customer performed article scanning in self-service shopping.

In accordance with a first embodiment of the invention, a system for self-service selection and purchasing of articles bearing coded indicia in a retail establishment comprises a plurality of customer-operated carts movable about the retail establishment, each cart including a multi-walled receptacle for receiving and transporting articles having product codes thereon, which articles may be selected for purchase; a plurality of modules, one for each cart, which are secured to said carts adjacent one end of said receptacle; each said module including a scanner for scanning said product code on said articles; each said module also including video camera means capable of covering a first area to record images of articles being scanned by the scanner and capable of covering a second area to record images of articles being placed in the receptacle; each said module also including data processing means for associating the information scanned by the scanner with the images recorded by the video camera means and for storing such associated information; each said module also including display means for displaying the data scanned by the scanner, and each said module also including a power supply; and checkout means to which the carts are directed when the purchasing of articles to be placed in their receptacles has been completed, said checkout means including means for receiving the module for each cart; said checkout means also including means for totaling and printing out the information scanned by the scanner and stored by the data processing means of said module; and said checkout means also including means for displaying the video information recorded by the module to enable an operator at the checkout means to verify the correctness of the actions of the customer in scanning and transporting articles to be purchased.

In accordance with a second embodiment of the invention, a method for self-service selection and purchasing of articles bearing code indicia in a retail establishment provided with a plurality of customer operated carts, each cart having a walled receptacle for receiving goods selected by the customer and a detachable module containing a scanner for scanning the code indicia on the goods and video camera means capable of covering a first area to record images of articles being scanned by the scanner and capable of covering a second area to record images of articles being placed in the receptacle, said establishment also being provided with a checkout counter having data processing means and video playback means, comprises the following steps: selecting and initiating of movement of a cart by the customer; selecting of articles to be purchased by the customer; scanning one by one of the articles to be purchased by the customer using the module scanner and simultaneous recording of the scanning operation by the video recording means; placing of the articles to be purchased by the customer in the receptacle of the cart and simultaneous recording of said placement operation by the video recording means; transporting of the selected articles in the receptacle cart by the customer to the checkout counter; coupling said module to the data processing means and the video playback means by a cashier at the checkout counter; printing a transaction record by the data processing means of the information scanned from the selected articles by the scanner; playing back the video record of the scanning and article placement transactions by the cashier to assure that these transactions have been properly performed by the customer; and making payment by the customer to the cashier to complete the purchase transaction.

It is accordingly an object of the present invention to provide an improved method and apparatus for self-service retail operations.

Another object is to provide an improved method and apparatus for customer performed article scanning in self-service shopping.

Another object is to provide an improved method and apparatus for self-service retail operations which employ a plurality of customer-operated carts and a plurality of detachable modules which may be secured to said carts and which include a scanner and video camera means to record images of articles being scanned and placed in a receptacle in the cart.

Another object is to provide an improved method and apparatus for self-service shopping which reduces the time required for a customer to complete a shopping operation in a retail establishment, and which provides safeguards against incorrect or incomplete recording of articles purchased.

Another object of the invention is, in a retail establishment, to minimize labor costs, improve service by speeding customer checking out and bagging, reduce the store front end checkout counter area, eliminate shelf labeling requirements and permit the customer to spend a higher proportion of total time in the store aisleways where product selections are made.

With these and other objects, which will become apparent from the following description, in view, the invention includes certain novel features of construction and combinations of parts, preferred forms or embodiments of which are hereinafter described with reference to the drawings which accompany and form a part of this specification.

BRIEF DESCRIPTION OF THE DRAWINGS

FIG. 5A is a perspective view of the electronic module.

FIG. 5B is a front view of the electronic module.

FIG. 5C is a rear view of the electronic module.

FIG. 6 is a perspective view of the reflective surfaces which are installed in the shopping cart.

DETAILED DESCRIPTION OF THE PREFERRED EMBODIMENT

Figure 1:
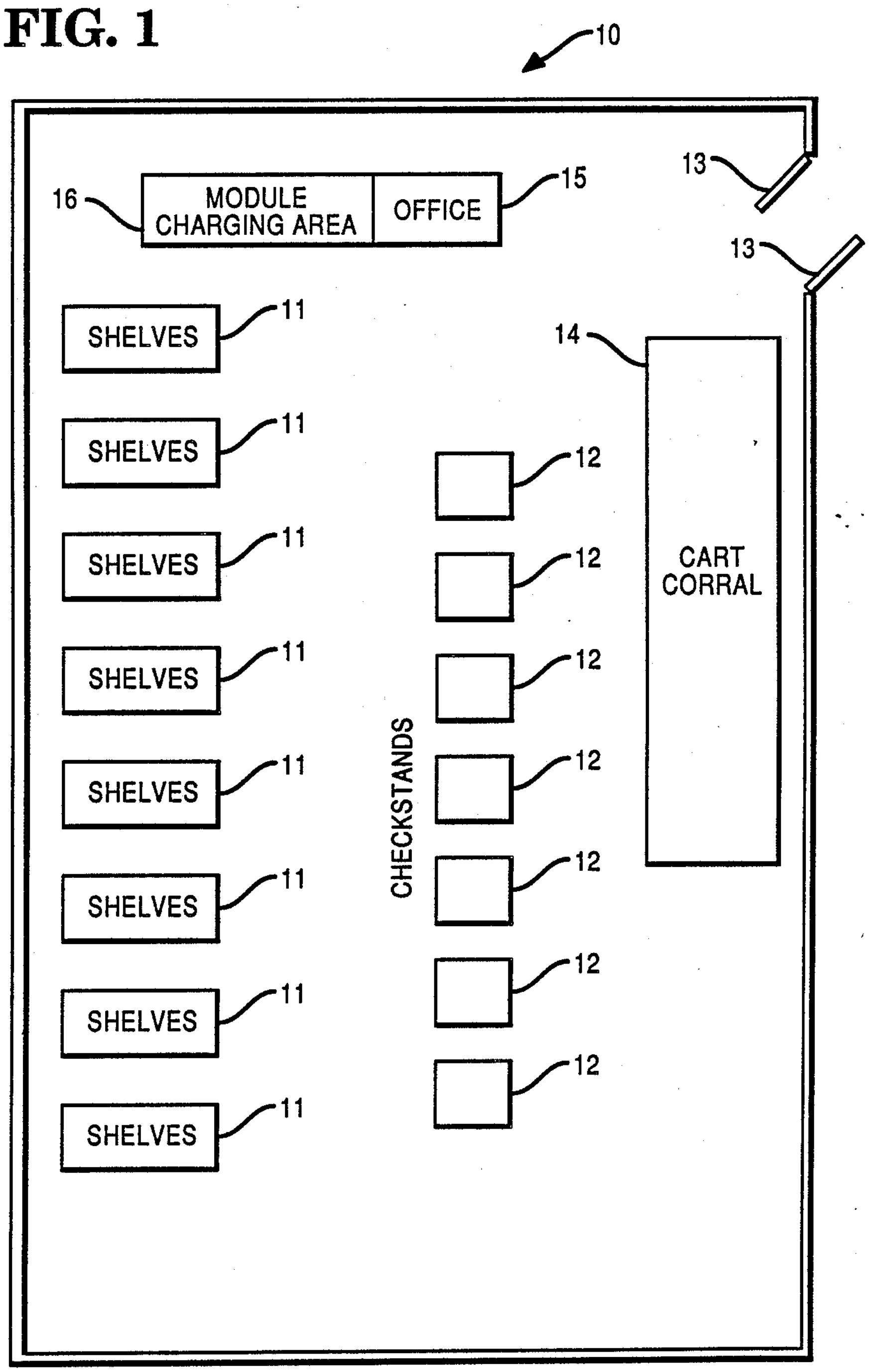
FIG. 1 is a plan view showing a layout of a store utilizing the present invention.

Referring now to FIG. 1, shown there is a plan view of a store arrangement in which the present invention may be used. A store 10 includes a plurality of shelves 11 on which merchandise is placed, a plurality of checkout counters or checkstands 12 at which merchandise selected by customers from the shelves 11 is checked out, doors 13 through which customers enter and exit the store, a cart corral 14 in which shopping carts 20 are stored between customer use, an office 15 for the store 10, and a module charging area 16 at which electronic modules 28 associated with the carts 20, as will subsequently be described, have their batteries charged after use.

Figure 2:
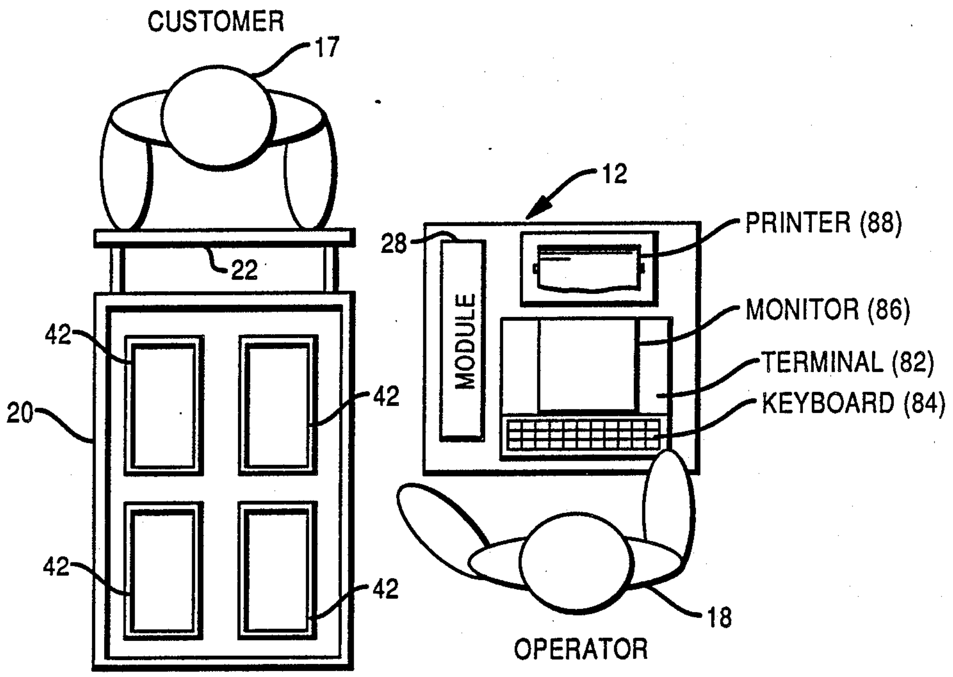
FIG. 2 is a plan view showing the checkout counter area of the arrangement of FIG. 1.

Shown in FIG. 2 is a more detailed diagram of the checkstand 12 showing a customer 17 in position there with a cart 20 containing a plurality of grocery bags 42, and showing an operator or cashier 18 in the process of performing a checkout operation. As will subsequently be described in greater detail, the checkstand 12 includes a terminal 82 having a keyboard 84, a display monitor 86 and a printer 88. The electronic module 28 which was attached to the cart 20 during the selection of articles for purchase by the customer 17 has been removed from the cart 20 and is electrically coupled to the components of the checkstand 12 for performance of the checkout operation.

Figure 3:
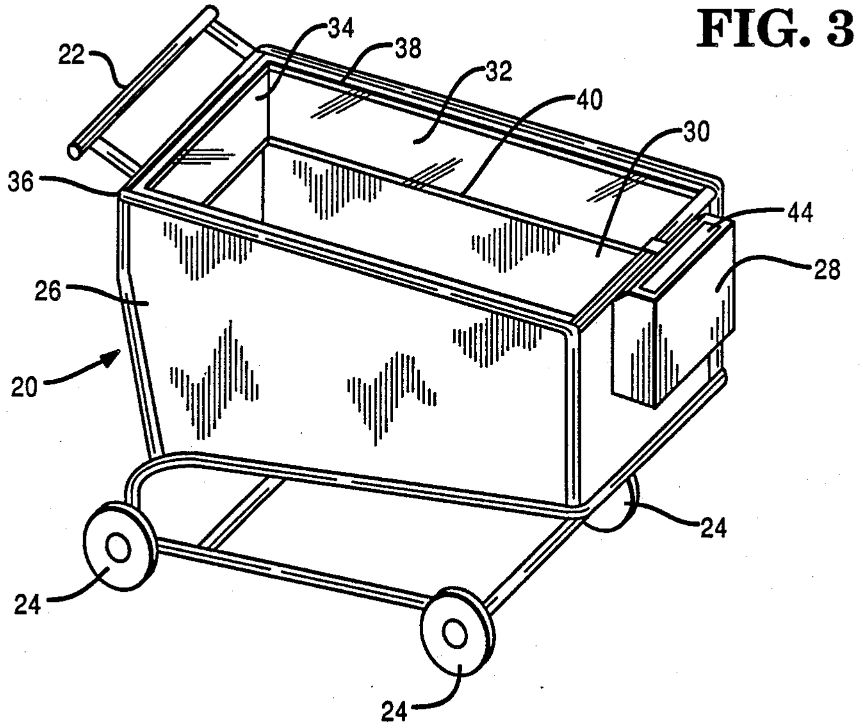
FIG. 3 is a perspective view of a shopping cart having interior reflective surfaces and an electronic module attached to one end thereof.

Referring to FIG. 3, shown there is a shopping cart 20 of a conventional basic design which has been modified in accordance with the present invention. The cart is pushed from place to place by a customer 17 who grasps a handle 22. The cart travels on four wheels 24. The cart includes a receptacle 26 into which groceries or other articles can be placed. At the end of the cart 20 opposite the handle 22, an electronic module 28 is detachably secured. Locking means are preferably provided to prevent the customer from switching modules 28 or changing the position of the module 28 on the cart 20. The module 28 will subsequently be described in detail. Along the upper portions of the three interior walls 30 of the receptacle 26 which are not adjacent to the module 28 are secured mirrors 32, 34 and 36, which are also shown separate from the cart 20 in FIG. 6. These mirrors are rectangular in shape, and of a size to fit snugly against their respective walls. Each mirror is provided along its upper edge with a stripe 38 which may be of a selected color, such as red, and is provided along its lower edge with another stripe 40, which may be of a different color, such as blue. As will subsequently be described in greater detail, these stripes help to define a region through which articles are moved, during a video recording operation.

Figure 4:
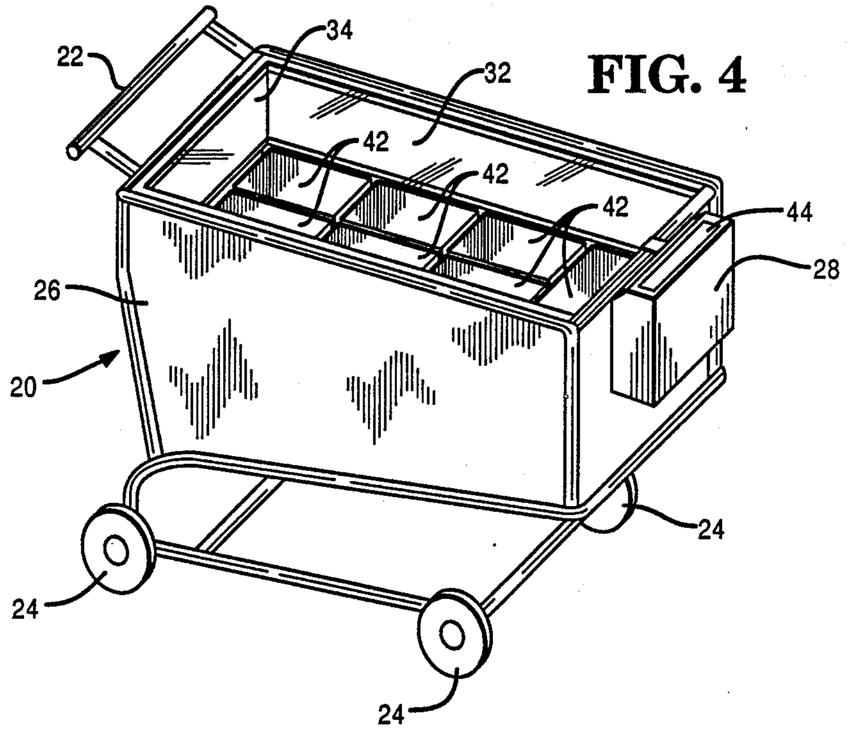
FIG. 4 is a perspective view similar to FIG. 1, showing a plurality of grocery bags placed in the receptacle portion of the shopping cart.

FIG. 4 is a view which is similar to the view of FIG. 3, and which additionally shows a plurality of grocery bags 42 placed in the receptacle 26 of the cart 20. The customer 17 may place articles to be purchased in the bags 42 after they have been scanned, as will subsequently be described, thus eliminating the need for a separate bagging operation at the checkout counter 12.

Shown in FIGS. 5A, 5B and 5C are three exterior views of the electronic module 28. This module includes a slot scanner 54 which operates through a glass covered aperture 44, a video recording device or camera 45 which operates to record images appearing both through the scanner aperture 44 and through a lens 46, a keyboard 48 to enable the entry of data into the module, and a display 50 for displaying information. A lockable clip or other suitable means 52 is attached to the exterior of the module 28 and provides a means to secure the module 28 to the cart 20.

Figure 7:
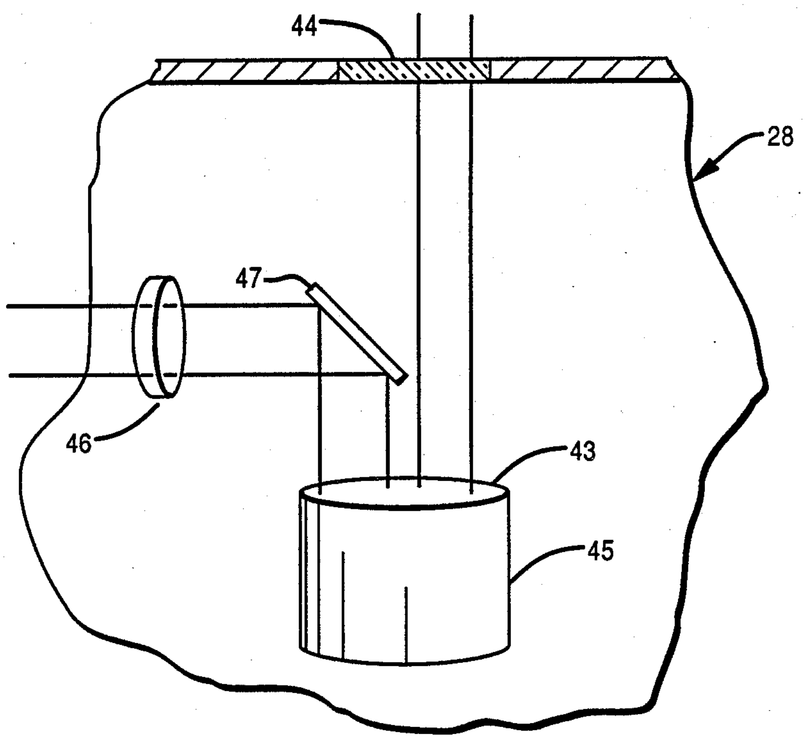
FIG. 7 is a diagrammatic view of the video recording apparatus contained within the electronic module.

The manner in which the video camera 45 is enabled to record images both through the aperture 44 and the lens 46 is shown diagrammatically in FIG. 7 and includes a single-sided mirror 47 positioned within the module 28 to reflect an image which passes through the lens 46 into one part of the field of vision of the lens 43 of the camera 45. At the same time, an image from the aperture 44 also appears on another part of the field of vision of the lens 43 of the camera 45.

Figure 15:
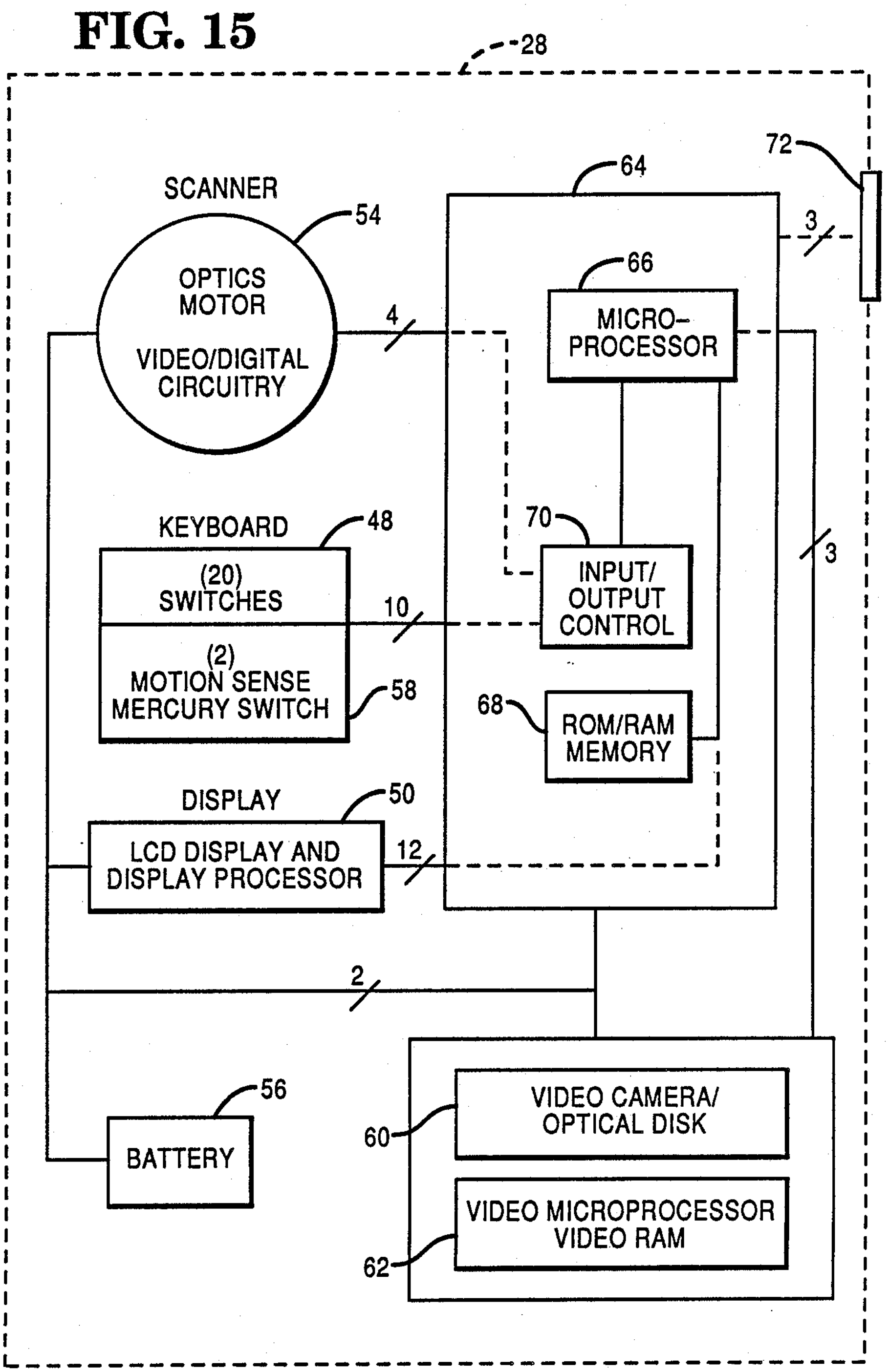
FIG. 15 is a block diagram of the electronic module.

A schematic diagram of the module 28 is shown in FIG. 15 and includes a scanner 54 which may be of a conventional design which directs a laser beam through the aperture 44 to scan bar codes on products selected for purchase. The scanner 54 includes an optics motor and video/digital circuitry.

Also shown in FIG. 15 are the keyboard 48 and the display 50. In addition, the module 28 includes a battery 56 to provide power to the module and a motion sensing device 58 which activates the module when a customer selects the cart 20 to which the module 28 is secured, and puts the cart in motion. Keeping the module 28 in an inactive state until cart movement has commenced saves battery power.

In addition, the module 28 contains a video camera and an optical disk for storing the images recorded, as represented by block 60. A video microprocessor and video random access memory, represented by block 62, are also included and are coupled to the video camera and optical disk combination of block 60 for exercising control functions.

The module 28 also includes a control system represented generally by block 64, which includes a microprocessor 66, a ROM/RAM memory 68, and input/output control circuitry 70. An external remote connector 72 is electrically coupled to the control system 64 to provide means for coupling the module 28 to elements of the employee-operated checkout counter 12 during checkout operations, to charge the battery 56 when necessary, and for other appropriate purposes. The connections between the various elements of the module 28 are represented in FIG. 15 by lines, and the numbers associated with the lines represent the minimum number of individual conductive paths which would be required in each case.

Figure 13:
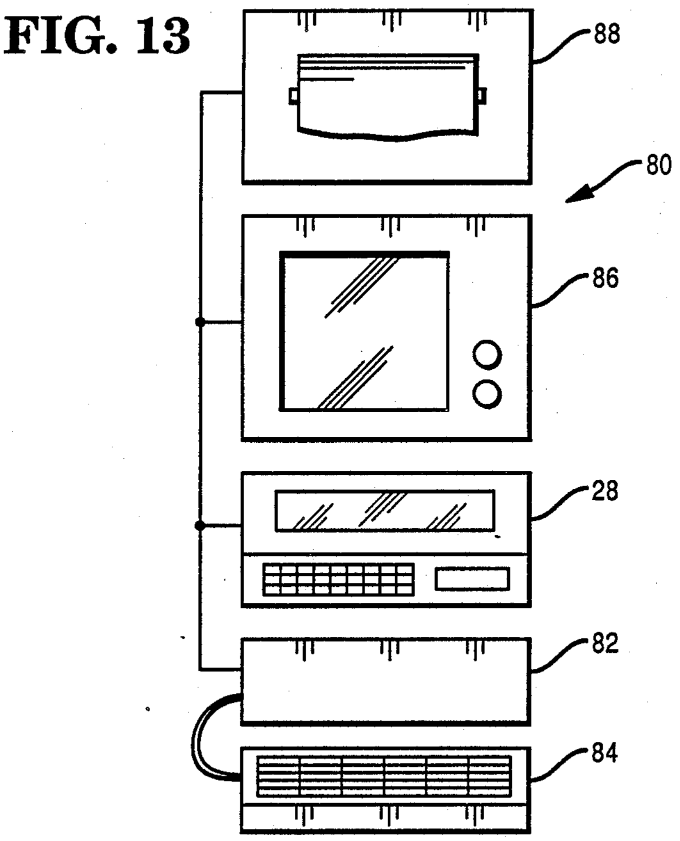
FIG. 13 is a diagrammatic view of the various components utilized at the checkout counter, including a module taken from the cart.

Shown in FIG. 13 is a diagrammatic representation of the apparatus which is located at the checkout counter or checkstand 12 (FIGS. 1 and 2) at the front of the store 10, and which is used by the store employee 18 to check out a customer 17 who has completed his or her purchases, so that the customer 17 may make payment for the articles which have been purchased, and then exit from the store 10. This apparatus is designated generally by the reference character 80, and includes a point-of-sale (POS) terminal 82 having a keyboard 84 coupled thereto. Any suitable POS terminal may be used, such as the NCR 7052, marketed by NCR Corporation, Dayton, Ohio. Also coupled to the terminal 82 are a color monitor 86 for viewing the video recording made by the electronic module 28 and a high-speed printer 88 for printing a record of the articles purchased by the customer, the prices of the articles and the total amount due.

Figure 14:
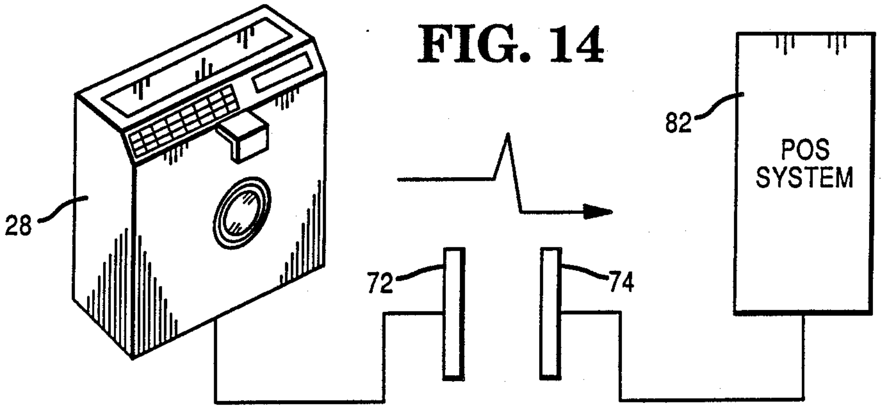
FIG. 14 is a diagrammatic view showing the transfer of data from the electronic module to the point of sale system at the checkout counter.

When the checkout operation for a given customer 17 and cart 20 is to commence, the electronic module 28 is removed from the cart 20 and is coupled to the POS terminal 82 by connecting the external remote connector 72 of the module 28 to a similar connector 74 of the POS terminal 82, as diagrammatically shown in FIG. 14.

Figure 16A:
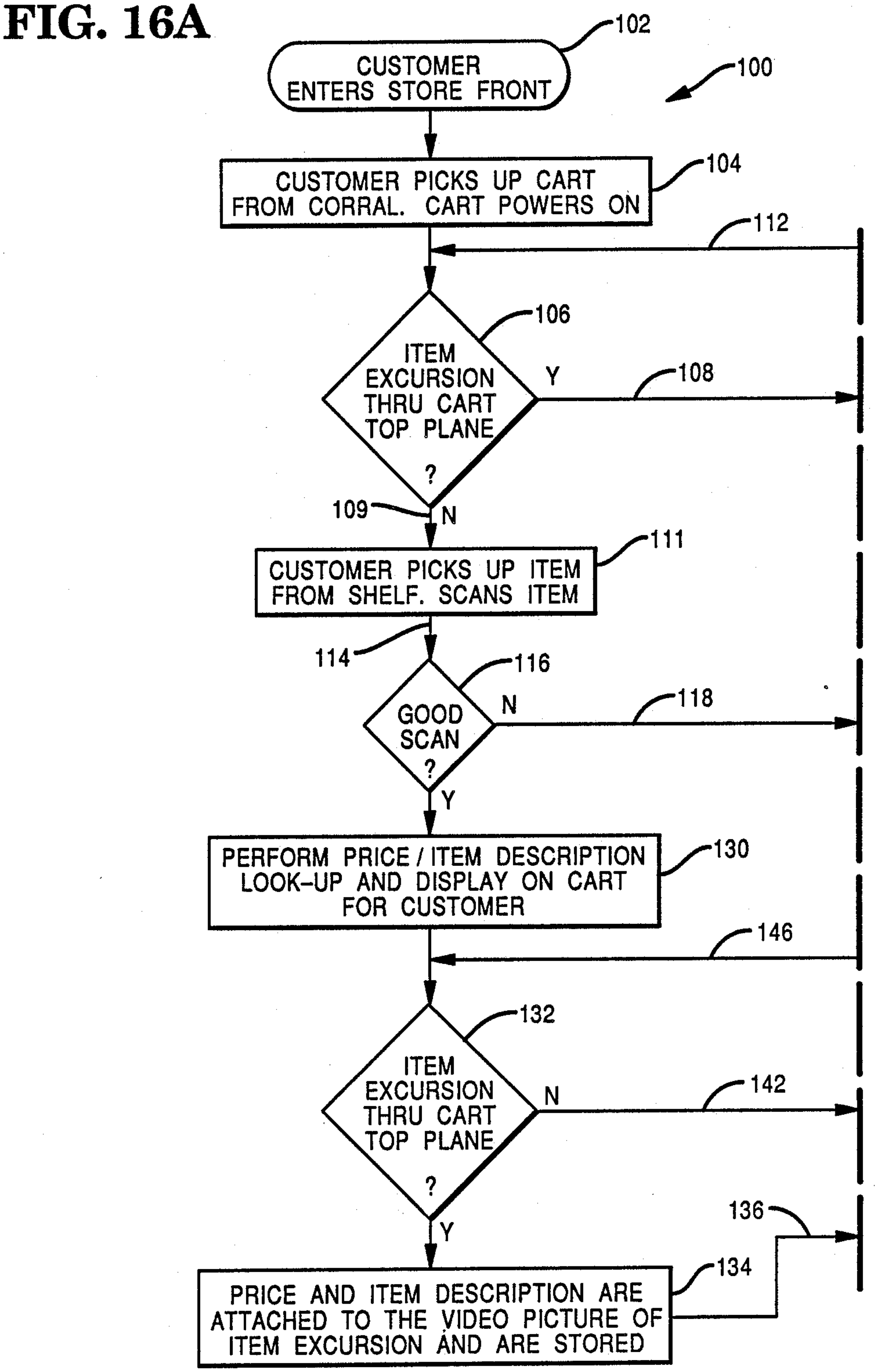
FIGS. 16A and 16B, taken together, constitute a flow diagram of the process of selection of articles by a customer for purchase.
Figure 16B:
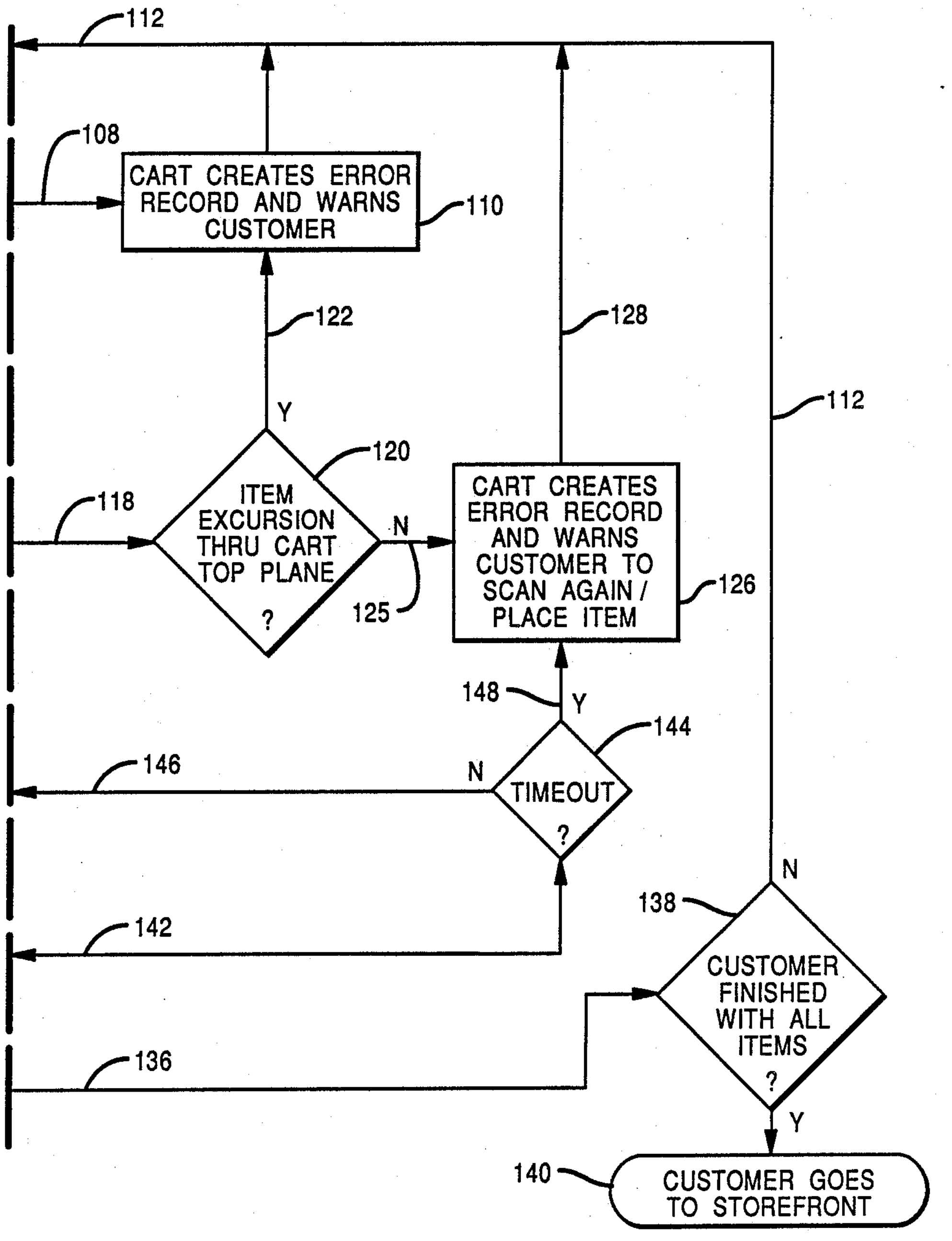

The process generally designated 100 by which the customer 17 selects and scans articles for purchase is shown in FIGS. 16A and 16B. As represented by block 102, this process commences when a customer 17 enters the store 10. The customer 17 then picks up a cart 20 from a cart corral. Movement of the cart 20 causes power to it from its battery 56 to be initiated by switch 58 (FIG. 15) as represented by block 104.

Figure 8:
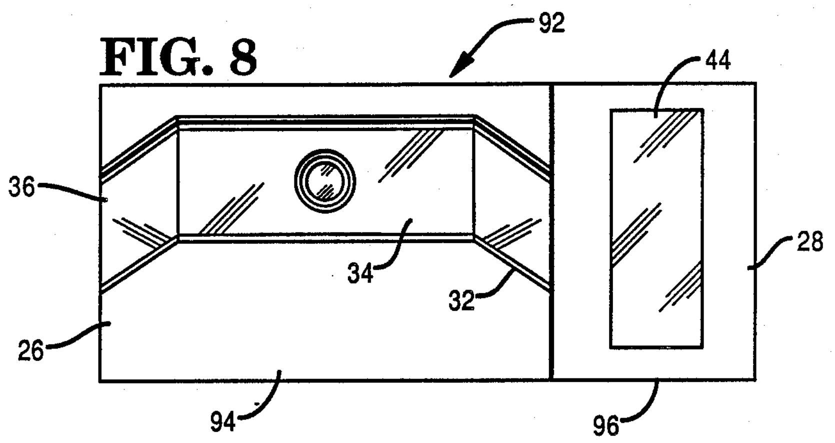
FIG. 8 is a diagrammatic view as viewed by the module video recorder showing the cart receptacle and the scanner slot of the electronic module in the absence of an article selected for purchase.
Figure 9:
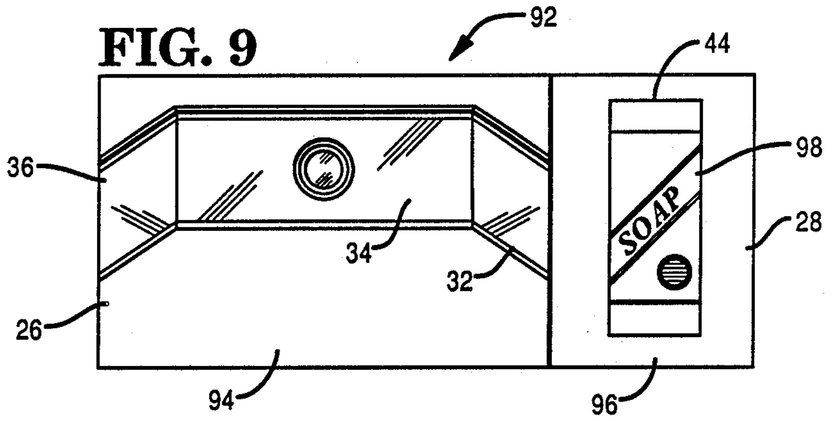
FIG. 9 is a view similar to FIG. 8 in which a video recording is made of a selected article being scanned by the module scanner.
Figure 10:
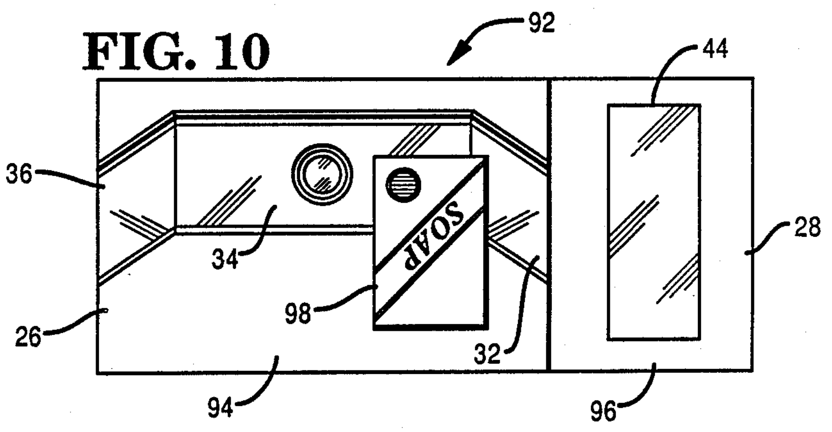
FIG. 10 is a view similar to FIGS. 8 and 9 in which a video recording is made of an article being placed in the cart receptacle after the same article has been scanned as shown in FIG. 9.

At this point, it may be helpful to refer to FIGS. 8, 9 and 10, which illustrate the manner in which the video camera 45 provides a transaction record which can inform the employee 18 at the checkstand 12 whether or not a scanning operation on a particular article was properly carried out before that article was placed in the receptacle 26 of the cart 20. These three figures represent three different records made by the video camera 45 during a proper scanning operation and placement of a selected article into a receptacle 26 of a cart 20 by a customer 17. In FIG. 8 is shown a two-part video record 92 in which the left part 94 as viewed in FIG. 8 represents the cart receptacle 26 as seen through the lens 46 and the right part 96 represents a view reflected by the mirror 47 looking upward through the scanner aperture 44. FIG. 8 shows the receptacle 26 and the scanner aperture 44 before the article selection has begun.

In FIG. 9, an article, shown here as a bar of soap 98, has been selected, and is first scanned by passing the article over the aperture 44, to enable the product code to be sensed from the article and entered into the memory 68 (FIG. 15). The part 96 of the record 92 records this operation, while the part 94 shows that no article is being placed in the receptacle 26 at this time.

Following the scanning operation, the bar of soap 98 may be placed in the receptacle 26 as shown in part 94 of the record 92 in FIG. 10. The two records of FIGS. 9 and 10 show that the article 98 was properly scanned before being placed in the receptacle 26, and also show that the article being placed in the receptacle 26 is the same one which was previously scanned. The video camera 45 may be controlled to operate for a predetermined time interval, such as approximately one-fifth of a second, for example, during each recording operation.

Returning now to FIG. 16A, the process is continued in decision block 106, in which a continuing determination is made as to whether an article or item is passed through a plane defined by the upper edges of the receptacle 26. This determination is made by the video camera 60 and the video processor 62 at approximately one-fifth second intervals. When there is no item excursion through the top plane of the cart receptacle 26, as shown in FIG. 8, there is no item present in the field of view of the camera 45. The video processor 62 inputs this "empty" view and digitizes it, storing it in the video processor RAM 62, once every one-tenth second. Every one-fifth second, the newly digitized view is input and compared to the digitized view which has been previously stored in RAM 62. When comparing these two views, the video processor specifically examines the bit stream which describes the red stripe 38 positioned at the top of the mirrors within the cart 20. When the video processor 62 finds a discontinuity within the bit stream describing the red stripe 38 (which is always located in the same RAM memory location), it drives a digital signal line to the main microprocessor 66 to indicate that the top plane of the receptacle 26 has seen an item excursion.

Figure 11:
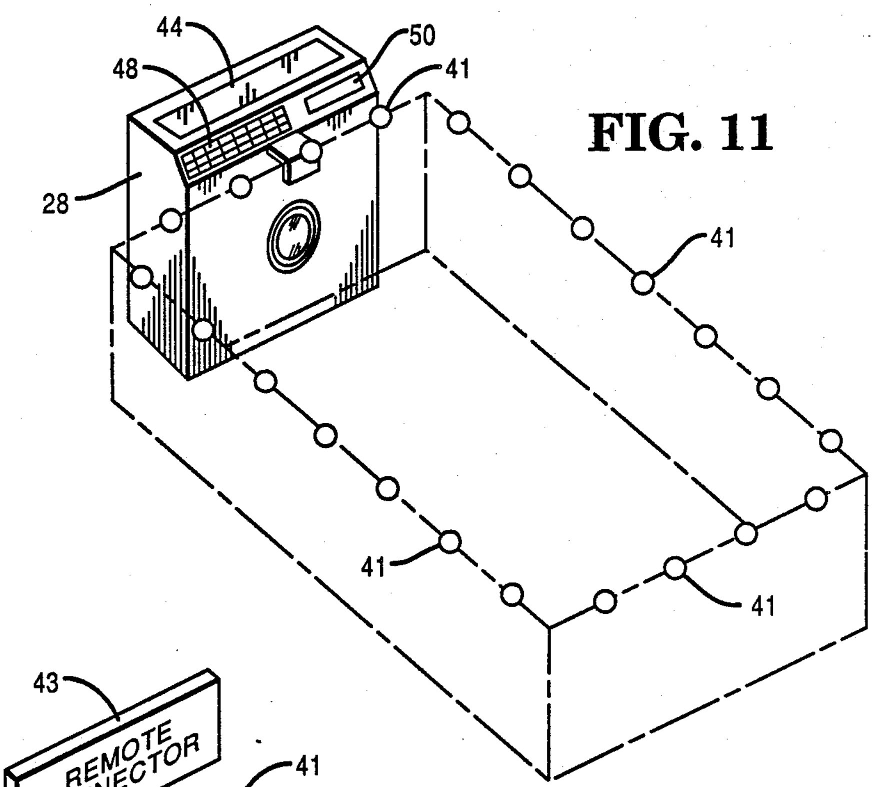
FIG. 11 is a partial perspective view of an alternative embodiment in which item gate sensors are used at the top of the shopping cart receptacle to detect the placement of articles therein.
Figure 12:
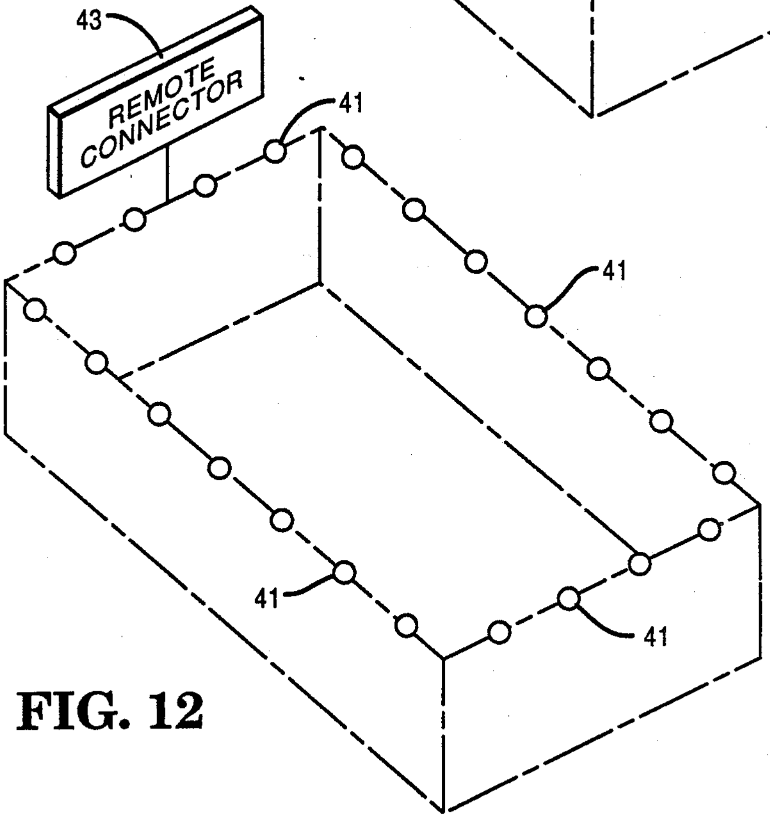
FIG. 12 is a partial perspective view of the alternative embodiment of FIG. 11, in which the electronic module has been removed and a remote connector is shown which connects the item sensors to the electronic module.

Alternatively, the receptacle 26 of the cart 20 may be provided with a plurality of sensors 41 (FIGS. 11 and 12) positioned along the top plane of the receptacle 26. These sensors detect the passage of an article through said top plane into the receptacle 26. As shown in FIG. 12, a remote connector 43 is connected to the sensors 41 and provides a connection with a corresponding remote connector 72 on the electronic module 28.

If an item is passed through said plane and placed in the cart 20, as represented by block 106 and path 108, the module 28 of the cart 20 creates an error record, as represented by block 110, and warns the customer on the display 50. An audible warning may also be used. The process then returns via path 112 to a point between blocks 104 and 106.

So long as no item is passed through the cart top plane without being properly scanned, the process continues in a normal manner via path 109 to block 111, in which the customer 17 picks up an item from a shelf 11 of the store 10 and scans it. In decision block 116, a determination is made as to whether or not the scan was a good one (that is, whether information was properly sensed from the bar code on the item). If not, the process continues along path 118 to a further decision block 120 in which a determination is made as to whether there has been an excursion of the item through the cart top plane. If so, the process proceeds along path 122 to the previously discussed block 110, and thence via path 112 to a point between blocks 104 and 106. If there has been no item excursion through the cart top plane, the process continues along path 125 to block 126, in which the module 28 creates an error record and warns the customer 17 to scan and place the item again. The process then returns over paths 128 and 112 to a point between blocks 104 and 106.

On the other hand, if a determination is made in block 116 that the scan is a good one, the process proceeds to perform a price/item description look-up and to display this information on the display 50 of the module 28 for the customer 17, as represented in block 130.

Next a determination is made in decision block 132 as to whether there has been an item excursion through the top plane of the receptacle 26 of the cart 20, as represented by block 132. If so, the price and item description are attached to or associated with the video picture of the item excursion and scanning by the module 28 and are stored for subsequent use during the checkout operation, as represented by block 134. The process then continues over path 136 to a decision block 138, in which a determination is made as to whether the customer 17 is finished with all items. If so, the customer 17 goes to the front of the store 10 as represented by block 140, where a checkout operation is performed. If not, the process returns along path 112 to a point between blocks 104 and 106 for selection of the next item.

Returning to the decision block 132, if there is no excursion of an item through the top plane of the cart receptacle 26, the process continues over a path 142 to a decision block 144, in which a time interval is measured for the item to be placed in the receptacle 26. Until the time interval has passed, the process loops back over path 146 to the decision block 132. Once the predetermined time interval has passed without an item excursion through the cart top plane, the process continues over path 148 to the previously mentioned block 126 and then over the path 128 to the return path 112.

Figure 17:
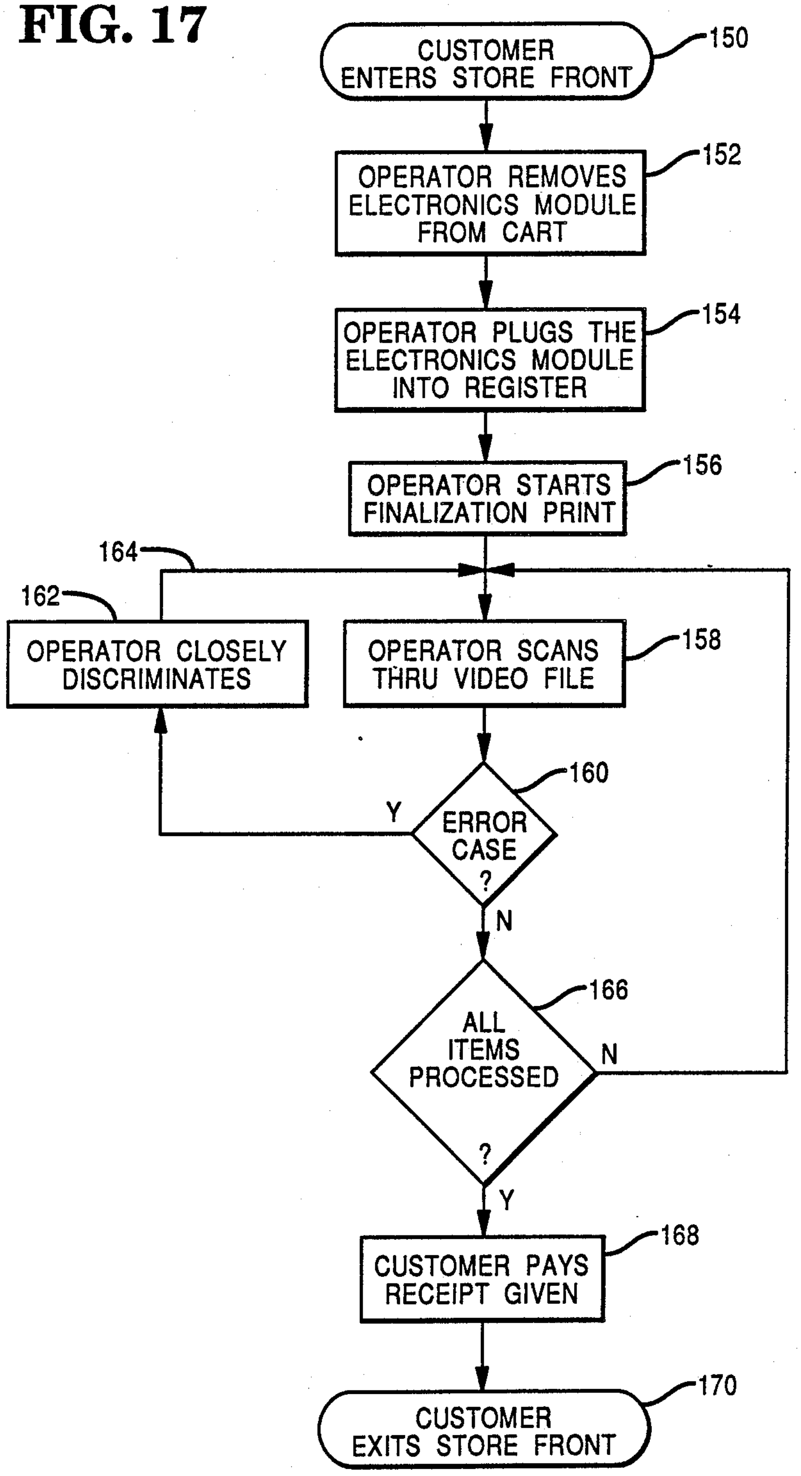
FIG. 17 is a flow diagram of the process by which the articles purchased by a customer are checked by a store employee to enable the customer to complete the purchase and exit the store.

Let it now be assumed that the customer 17 has completed the selection of all desired items, has properly scanned them and placed them in the cart receptacle 26, and has proceeded to the front of the store 10, as represented by block 140. A checkout operation is now performed, as represented by the flow diagram of FIG. 17, and is commenced by the customer 17 entering the front of the store 10, as represented by block 150.

As the first step in the checkout process, the cashier or other employee 18 removes the module 28 from the cart 20, as represented by block 152 and plugs the module 28 into electrical connection with the terminal 82 (FIG. 13), as represented by block 154. If desired, suitable electrical connections could be provided to enable the checkout operation to be carried out with the module 28 still secured to the cart 20, but it is considered to be generally desirable to remove the module 28 from the cart 20 at this point. Alternatively, a video storage disk could be removed from the module 28 and plugged into a reader port associated with the video display 86.

The cashier 18 then commences a print-out of all of the items selected by the customer 17 (block 156) by accessing the appropriate storage unit in the microprocessor 66 of the module 28 and causing the data contained therein to be printed on an appropriate record medium, which may resemble a conventional cash register tape. In association with generation of this print-out, the cashier 18 scans through the video file which was generated during the process of item selection by the customer 17 (block 158) to determine whether any improper activities, such as scanning of one item and placing of a higher priced item in the receptacle 26 of the cart 20, may have taken place. In this activity, the cashier 18 will be aided by any error records generated by the module 28 during the item selection process.

In case it is determined that an error has been made (decision block 160), a section of the video tape may be viewed again at a slower speed (block 162), and/or the items within the receptacle 26 of the cart 20 may be actually physically examined by the cashier 18, after which the process loops back again via path 164 to block 158. In the event that no errors are discovered, the process continues with a determination as to whether or not all items have been processed, as represented in block 166. If so, the checkout transaction is completed, the customer 17 makes payment, and a receipt is given (block 168), after which the customer exits the store front (block 170). If all items have not yet been processed, the process loops back via path 172 to block 158, and the remaining items are processed.

Following completion of the transaction, the cashier will remove the module 28 from its electrical coupling to the terminal 82, and will place it on a charging rack in the module charging area 16 for recharging of the battery 56, if necessary, after which said module can be attached to another cart in the cart corral 14, ready for selection for use by a future customer 17.

The customer 17 is free to take the cart 20, with the module 28 removed therefrom, through the doors 13 and outside the store 10 for transportation of the selected articles to the customer's car, for transportation of the selected items to their destination.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. A system for self-service selection and purchasing of articles bearing coded indicia in a retail establishment, comprising:

a plurality of customer-operated carts moveable about the retail establishment, each cart including a multi-walled receptacle for receiving and transporting articles having product codes thereon, which articles may be selected for purchase;

a plurality of detachable modules, one for each cart, which are secured to said carts adjacent one end of said receptacle; each said module including a scanner for scanning said product code on said articles, each said module also including video camera means capable of covering a first area to record images of articles being scanned by the scanner and capable of covering a second area to record images of articles being placed in the receptacle; each said module also including data processing means for associating the information scanned by the scanner with the images recorded by the video camera means and for storing such associated information; each said module also including display means for displaying the data scanned by the scanner; and each said module also including a power supply; and checkout means to which the carts are directed when the purchasing of articles to be placed in their receptacles has been completed; said checkout means including means for receiving the module for each cart; said checkout means also including means for totaling and printing out the information scanned by the scanner and stored by the data processing means of said module; and said checkout means also including means for displaying the video information recorded by the module to enable an operator at the checkout means to verify the correctness of the actions of the customer in scanning and transporting articles to be purchased.

2. The system of claim 1, in which each of the carts has reflective surfaces disposed along the upper portions of the inner surfaces of the walls of said receptacle, said reflective surfaces providing a reference position for the recording of articles being placed in the receptacle.

3. The system of claim 1 in which the module includes means for securing it to a cart, and in which each module is removed from its cart during checkout operations.

4. The system of claim 3, also including means for recharging said module power supply after said module has been removed from said cart.

5. The system of claim 1, also including means for initiating operation of said module when the cart on which it is mounted is moved from a stationary status by a customer.

6. The system of claim 1, in which said receptacle is configured to receive at least one container into which articles can be placed by the customer, so that the container containing articles can be removed by the customer at the conclusion of a checkout operation.

7. The system of claim 2 in which the reflective surfaces contain upper and lower colored borders to facilitate the provision of a reference position by said reflective surfaces.

8. The system of claim 7 in which the upper and lower borders are of different colors.

9. The system of claim 5 in which the means for initiating operation of the modules is a motion-sensitive switch located within the module.

10. The system of claim 1 in which an optical disk drive is provided in the module for storing the images recorded by the video camera means.

11. The system of claim 6 in which the bag is of a height such that the top of the container does not extend above the lower edge of the reflective surfaces when the container is placed within the receptacle.

12. The system of claim 1 in which said module also includes means for displaying item description and price to the customer each time that an article is scanned.

13. The system of claim 1 in which the video camera means is timed to record for a limited duration during each recording operation.

14. The system of claim 13 in which said limited duration is approximately one-fifth of a second.

15. The system of claim 7 in which said cart and said module include means to produce and store an error indication if an article is placed in the receptacle without corresponding scanner activity, said means employing the video camera means as a sensing device to detect the passage of an item across the upper colored border on the reflective surfaces.

16. The system of claim 1 in which said cart and said module include means to produce and store an error indication if an article is placed in the receptacle without corresponding scanner activity.

17. The system of claim 16 in which said means to produce and store an error indication includes a plurality of sensing devices mounted around the upper periphery of the cart receptacle.

18. A method for self-service selection and purchasing of articles bearing code indicia in a retail establishment provided with a plurality of customer operated carts, each cart having a walled receptacle for receiving goods selected by the customer and a detachable module containing a scanner for scanning the code indicia on the goods and video camera means capable of covering a first area to record images of articles being scanned by the scanner and capable of covering a second area to record images of articles being placed in the receptacle, said establishment also being provided with a checkout counter having data processing means and video playback means, said method comprising the following steps:

selecting and initiating of movement of a cart by the customer;

selecting of articles to be purchased by the customer;

scanning one by one of the articles to be purchased by the customer using the module scanner and simultaneous recording of the scanning operation by the video recording means;

placing of the articles to be purchased by the customer in the receptacle of the cart and simultaneous recording of said placement operation by the video recording means;

transporting of the selected articles in the receptacle cart by the customer to the checkout counter;

coupling said module to the data processing means and the video playback means by a cashier at the checkout counter;

printing a transaction record by the data processing means of the information scanned from the selected articles by the scanner;

playing back the video record of the scanning and article placement transactions by the cashier to assure that these transactions have been properly performed by the customer; and making payment by the customer to the cashier to complete the purchase transaction.

19. The method of claim 18 in which the step of coupling the module to the data processing means also includes removing the module from the cart.

20. The method of claim 19 in which the modules are battery powered, also including the step of recharging the battery of the module after the module has been removed from the cart at the checkout counter to prepare the module for future use with another cart.

21. The method of claim 18 in which the initiation of movement of the cart by the customer activates the module for operation.

22. The method of claim 18 in which the playing back of the video record of the scanning and article placement transactions by the cashier can be performed at varying speeds in accordance with the cashier's perception of the degree of need to verify the accuracy of the customer's scanning and placement of the selected articles into the cart.

23. The method of claim 18 in which the video recording of the placement by the customer of selected articles into the receptacle of the cart is facilitated by the addition of reflective surfaces disposed along the upper portions of the inner surfaces of the walls of said receptacle.

24. The method of claim 23 in which the reflective surfaces of the inner walls of the receptacle contain upper and lower colored borders to facilitate the provision of a reference position by said reflective surfaces.

25. The method of claim 24 in which the upper and lower borders are of different colors.

26. The method of claim 18 in which a container is provided within the receptacle of the cart and the articles to be purchased by the customer are placed within the container.

27. The method of claim 18, also including the step of providing a record of an error indication in said module if placement of an article in the receptacle of the cart is not accompanied by the scanning of the article.

* * * * *